(12) United States Patent
Doerr et al.

(10) Patent No.: US 11,402,808 B2
(45) Date of Patent: Aug. 2, 2022

(54) CONFIGURING A SYSTEM WHICH INTERACTS WITH AN ENVIRONMENT

(71) Applicant: Robert Bosch GmbH, Stuttgart (DE)

(72) Inventors: Andreas Doerr, Stuttgart (DE); Christian Daniel, Leonberg (DE); Michael Volpp, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 322 days.

(21) Appl. No.: 16/845,571

(22) Filed: Apr. 10, 2020

(65) Prior Publication Data

US 2020/0333752 A1 Oct. 22, 2020

(30) Foreign Application Priority Data

Apr. 16, 2019 (EP) .................................... 19169460

(51) Int. Cl.
*G05B 13/02* (2006.01)
*G05B 13/04* (2006.01)
*G06F 17/18* (2006.01)
*G06N 3/08* (2006.01)

(52) U.S. Cl.
CPC ......... *G05B 13/029* (2013.01); *G05B 13/041* (2013.01); *G06F 17/18* (2013.01); *G06N 3/08* (2013.01)

(58) Field of Classification Search
None
See application file for complete search history.

(56) References Cited

PUBLICATIONS

John Schulman et al., "Proximal Policy Optimization Algorithms", 2017, pp. 1-12. https://arxiv.org/abs/1707.06347.
Diederik P. Kingma and Jimmy Ba, "Adam: a Method for Stochastic Optimization", 2017, pp. 1-15. https://arxiv.org/abs/1412.6980.
Y. Duan et al., "Benchmarking Deep Reinforcement Learning for Continuous Control", Proceedings of the 33rd International Conference on Machine Learning, New York, NY, USA, JMLR: W & CP, vol. 48, 2016, pp. 1-14. https://arxiv.org/abs/1604.06778.
J. Schulman et al., "Trust Region Policy Optimization", Proceedings of the 31st International Conference on Machine Learning, Lille, France, JMLR: W & CP, vol. 37, 2015, pp. 1-16. https://arxiv.org/abs/1502.05477.

(Continued)

*Primary Examiner* — Carlos R Ortiz Rodriguez
(74) *Attorney, Agent, or Firm* — Norton Rose Fulbright US LLP; Gerard Messina

(57) ABSTRACT

A system is described for configuring another system, e.g., a robotics system. The other system interacts with an environment according to a deterministic policy by repeatedly obtaining, from a sensor, sensor data indicative of a state of the environment, determining a current action, and providing, to an actuator, actuator data causing the actuator to effect the current action in the environment. To configure the other system, the system optimizes a loss function based on an accumulated reward distribution with respect to a set of parameters of the policy. The accumulated reward distribution includes an action probability of an action of a previous interaction log being performed according to the current set of parameters. The action probability is approximated using a probability distribution defined by an action selected by the deterministic policy according to the current set of parameters.

15 Claims, 5 Drawing Sheets

(56) References Cited

PUBLICATIONS

R. J. Williams, "Simple Statistical Gradient-Following Algorithms for Connectionist Reinforcement Learning", Springer, Machine Learning, vol. 8, 1992, pp. 229-256.
Andrew Levy et al., "Learning Multi-Level Hierarchies With Hindsight", 2019, pp. 1-15.
Marcin Andrychowicz Etal., "Hindsight Experience Replay", 31st Conference on Neural Information Processing Systems (NJPS 2017), Long Beach, CA, USA, 2017, pp. 1-15.
Li, Yuxi: "Deep Reinforcement Learning: An Overview" (2018), Manuscript, pp. 1-85; XP055632308.
Nachum, et al.: "Data-Efficient Hierarchical Reinforcement Learning", (2018), 32nd Conf. on Neural Information Processing Systems NIPS, Canada, XP055631416, pp. 1-17.

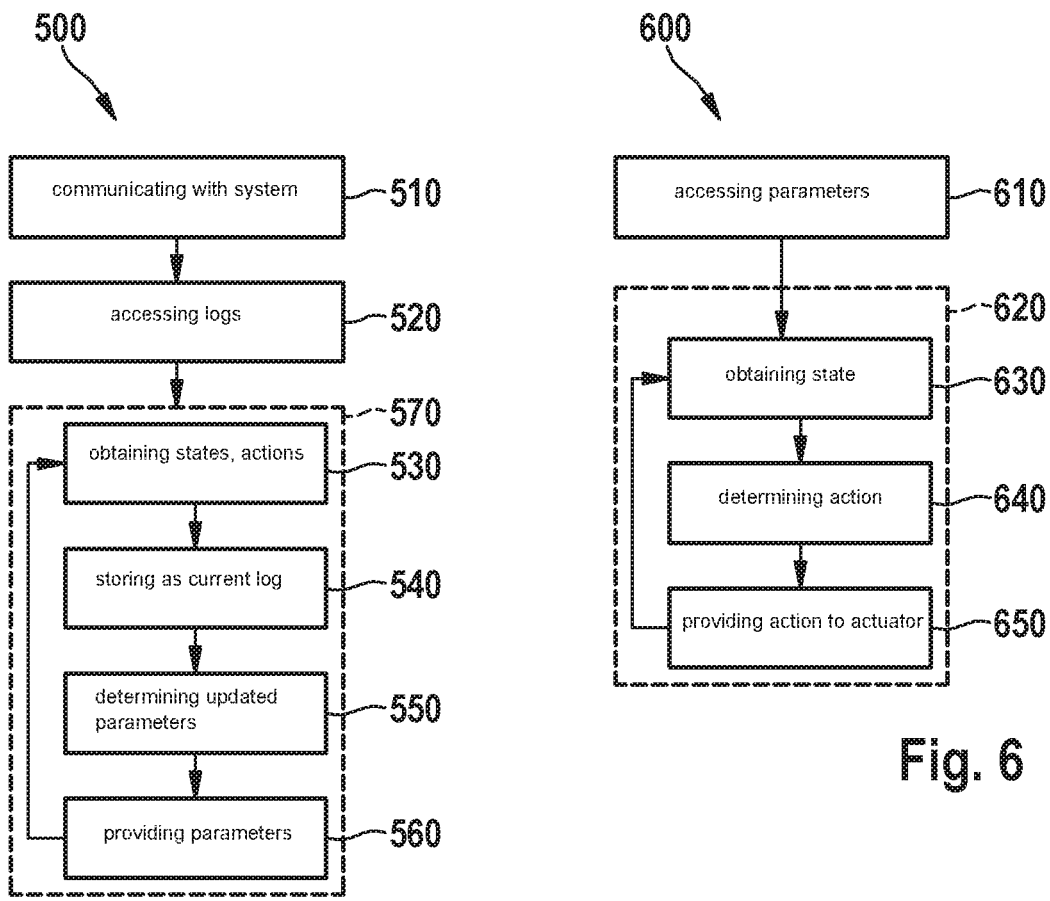
Fig. 5
Fig. 6
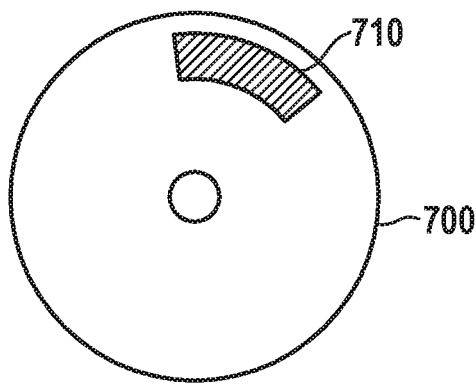
Fig. 7

CONFIGURING A SYSTEM WHICH INTERACTS WITH AN ENVIRONMENT

CROSS REFERENCE

The present application claims the benefit under 35 U.S.C. § 119 of European Patent Application No. EP 19169460.3 filed on Apr. 16, 2019, which is expressly incorporated herein by reference in its entirety.

FIELD

The present invention relates to a system and computer-implemented method for configuring another system which interacts with an environment according to a deterministic policy, such as a robotic system operating in a manufacturing line. The present invention further relates to the system for interacting with the environment and a corresponding computer-implemented method. The present invention further relates to a computer-readable medium comprising instructions to perform one or both methods, and to a computer-readable medium comprising a set of parameters of the deterministic policy.

BACKGROUND INFORMATION

Computer-controlled systems for interacting with an environment are described in the related art. Such systems typically include one or more sensors to obtain measurements of the environment, one or more actuators to perform actions that affect the environment, and a processor subsystem to determine the action based on the sensor measurements. The procedure by which the action is determined is often referred to as the policy of the computer-controlled system. A policy may be parametrized by a set of parameters. For example, depending on the parameters, the same system be configured to perform different tasks. Computer-controlled systems include robotic systems, in which a robot can perform one or more tasks automatically, e.g., under control of an external device or an embedded controller. Further examples of systems that can be computer-controlled are vehicles and components thereof, domestic appliances, power tools, manufacturing machines, personal assistants, access control systems, drones, nanorobots, and heating control systems. Various computer-controlled systems can operate autonomously in an environment, e.g., autonomous robots, autonomous agents, or intelligent agents.

Conventional systems can configure, in other words train, a computer-controlled system, e.g., determine a set of parameters of the policy of the computer-controlled system that let it perform a given task. In areas like robotics, determining such a set of parameters may give rise to a high-dimensional and/or continuous control problems that may be tackled using reinforcement learning techniques. In reinforcement learning, the set of parameters is optimized with respect to a given reward function. In the paper "Proximal Policy Optimization Algorithms", by John Schulman et al. (incorporated herein by reference and available at https://arxiv.org/abs/1707.06347), a reinforcement learning method is described that optimizes a set of parameters by alternatingly interacting with the environment and optimizing a surrogate objective function with respect to the interactions that were just performed. The policy is a stochastic, or in other words probabilistic, policy. This means that noise is injected into each action, e.g., each actuator parameter. The noise is used for exploration and to update the policy to adjust likelihoods of advantageous actions.

SUMMARY

A problem of existing systems for interacting with an environments and systems for training them, such as those discussed above, is that they require many environment interactions to be able to train the computer-controlled system to perform a given task. For example, training a self-driving car according to existing techniques may require millions of test drives, or training a manufacturing robot may require performing the manufacturing operation on millions of samples. This can be very costly and time-consuming. In other words, existing systems are data-inefficient in the sense that they are not able to make sufficiently full use of data learned from previous interactions with the environment. For this reason, such training systems are typically only applied to simulated environment interactions, leading to less accurate policies when applied in real physical environments.

A related problem is that the data that existing systems collect from previous environment interactions, e.g., actions performed by the computer-controlled system and measures of the state of the environment after performing these actions, suffers from high variance, in other words bad stability. This can slow the rate at which such collected data can be used to improve the policy, slowing convergence to the optimal policy. The inventors realized that one cause for this high variance in the collected data is that noise is present in both the actions performed, e.g., by the actuators, and in the environment states that are measured, e.g., by the sensors. In particular, noise injected in the actions when executing a policy causes a variance which may increase linearly with the length of the horizon.

Moreover, previous techniques may not always be able to explore the full set of possible behaviors of the computer-controlled system due to the way the policy is adapted based on previous environment interactions. In particular, previous techniques may get stuck in local optima because they effectively use a local search heuristic by updating the policy based on the interactions that were just performed. For example, at some point in training, small changes in the direction of a self-driving car may just steer the car off its straight course and thereby impair the overall outcome, whereas a bigger change in direction may help the car avoid an obstacle. Trying out such a bigger change may however not be justified based on the last few interactions that were performed, so that a local search heuristic may not suggest such a change. Hence, a sub-optimal policy for performing the given task may be obtained.

To address these and other problems in the state of the art, in accordance with a first aspect of the invention, an example system for configuring another system is provided in accordance with the present invention. The other system is a system configured to interact with an environment, as described for example in the background section. Here and elsewhere, the system for configuring another system is also referred to as "configuration system" or "training system".

In accordance with a further aspect of the present invention, a system configured to interact with the environment is provided in accordance with the present invention. Here and elsewhere, the system configured to interact with the environment is also referred to as "computer-controlled system", "physical system", or simply as "other system" to contrast it with the configuration system.

In accordance with further aspects of the present invention, an example method of configuring a system and a method of interacting with an environment are provided. In accordance with a further aspect of the present invention, a computer-readable medium is provided. In accordance with a further aspect of the present invention, a computer-readable medium is provided.

The above measures may involve a computer-controlled system interacting with an environment according to a policy. Given a state of the environment, the policy may select an action to be taken by the system that interacts with it. The policy may take as input an inferred state inferred from sensor data. The sensor data may be indicative of the actual physical state of the environment. For example, the sensor data may comprise measurements obtained from one or more sensors. For example, one or more of a temperature, a pressure, a location, and an orientation may be measured. The measurements may also comprise camera images, sound recordings, etc. The measurements are typically noisy and/or incomplete, and in that sense, the state inferred from it may be regarded as an approximation of the actual physical state. An inferred state is sometimes also known as an observation, e.g., as determined from measurements by an observer. As is conventional, the inferred state may comprise the measurements themselves and/or a reconstruction of the physical state determined from the measurements. The inferred state may also comprise a history of measurements and/or reconstructed physical states, e.g., over a fixed time window. An inferred state is typically represented as a vector of numbers, e.g., floating-point values, e.g., the state space of environment states is typically smooth, e.g., continuous. For simplicity, the inferred state is also referred to below simply as the "state".

Interaction with the environment may take place by determining a current action and providing actuator data to an actuator causing the actuator to effect the current action in the environment. The environment, e.g., the available actuators, may define the set of actions that are available to be performed, sometimes called the action space. The current action may be selected from the action space. Possible actuators include hydraulic, pneumatic, and electric actuators. There can also be multiple actuators. The action is typically also represented as a vector of numbers, e.g., representing one or more parameters for an actuator or for multiple actuators. The action space is typically smooth, e.g., continuous.

The policy may be a deterministic policy, e.g., the policy may be a function returning a fixed action given an inferred state. In particular, also during the configuration of the physical system, the fixed action returned by the policy may be executed rather than sampling an action according to a probability distribution over possible actions returned by the policy. The policy may be parametrized by a set of parameters. Configuring the system executing the policy may involve iteratively optimizing this set of parameters. Various types of policies and corresponding sets of parameters to be optimized are known from the literature, e.g., linear feature-based policies, PID controllers, linear state-feedback controllers, (deep) neural networks, etc. The policy is typically differentiable, which may enable the use of various optimization methods to the problem of optimizing the set of parameters.

In accordance with example embodiments of the present invention, in order to configure the system interacting with the environment, the set of parameters of the policy may be iteratively optimized. In particular, this may involve, in an iteration, optimizing a loss function based on an accumulated reward distribution with respect to the set of parameters, e.g., a loss function indicative of a success of the policy in interacting with the environment. The accumulated reward is also sometimes called return. Optimizing the set of parameters may comprise determining a set of parameters that maximizes or minimizes the loss function. For example, a so-called policy gradient method may be applied in which the loss function is maximized or minimized with respect to the set of parameters.

The distribution of the accumulated reward may be defined based on accumulated rewards of one or more interactions with the environment. The accumulated reward of an interaction is typically based on a given, e.g., pre-defined, reward function. Such a reward function may provide a reward value given a state of the environment and an action performed in that state. For example, the accumulated reward can be computed from reward values for respective states and actions of the interaction, although it is noted that in various cases, the reward function may be defined to only provide a reward at a certain point, e.g., if a certain goal has been reached or even at the end of the interaction. The reward function may be user-specified.

Interestingly, the accumulated reward distribution may be based on at least one previous interaction log determined in a previous iteration. The results of interacting with the environment in an iteration may form an interaction log stored in a set of interaction logs. Typically, such an interaction log comprises interaction data indicative of a sequence of states of the environment and of corresponding actions performed by the physical system, and the set of parameters that was used by the physical system to perform the interaction. Interaction logs can include an accumulated reward of the interaction, but it is also possible for the training system to recompute the accumulated reward as needed. To define the accumulated reward distribution, all previous interaction logs may be used, or a subset of them. Also interaction logs of the current iteration may be used. Interaction logs from previous iterations have generally been obtained by interacting with the environment according to a previous set of parameters. That is, previous interaction logs are typically off-policy samples with respect to the current set of parameters. Still, the inventors were able to re-use the previous interaction log making use of importance sampling, e.g., by determining of a probability of the previous interaction log occurring according to the current set of parameters.

Through the various measures in accordance with the present invention, particularly fast progress in iteratively improving the set of parameters is achieved. Namely, by using interaction logs from previous iterations, more available data can be incorporated, leading to better updates to the set of parameters. Thereby, data-efficiency is improved, e.g., less interactions with the environment are needed. Especially when the environment is a physical environment, interacting with the environment is typically costly and time-consuming, so reducing the amount of interaction is particularly beneficial. Moreover, using previous interactions, especially stochastically, reduces the chances of getting stuck in a local minimum since recent interactions suggesting particular modifications to the set of parameters can be offset by experiences from previous iterations. Also, the use of previous interactions allows to backtrack from sets of parameters with low expected reward, e.g., to store promising sets of parameters and be able to return to their part of the parameter space.

In accordance with example embodiments of the present invention, the use of deterministic policies, as opposed to probabilistic/stochastic policies, may further improve the optimization process and thus the policy that is obtained. Probabilistic policies typically provide a probability distribution of actions to be performed in a given state. Such a probability distribution can be used in order to obtain a gradient signal on how to update the policy parameters to increase the likelihood of successful actions. Stochastic approaches may drive exploration through noise in the action space, e.g., policy covariance. While optimization using stochastic approaches may converge in the limit, the resulting explorative behavior is typically inefficient since it exhibits no temporal correlations.

Instead, various measures may involve using a deterministic policy. With a deterministic policy, inefficiencies due to adding temporally uncorrelated noise to policies may be avoided, decreasing variance. Only the stochasticity of the environment may contribute noise. Interestingly, although the use of stochastic policies was thought to be intrinsically required in policy gradient-type methods, e.g., due to the need to update policies to increase the likelihood of advantageous actions, the inventors were still able to use a deterministic policy instead. In particular, in various embodiments, the use of the previous interaction log may comprise determining an action probability of an action of the previous interaction log being performed according to the current set of parameters. In a deterministic policy, this probability is either zero or one, making off-policy evaluation infeasible. However, that exploration may be achieved by approximating the action probability using a probability distribution defined by an action selected by the deterministic policy according to the current set of parameters.

The action probability can occur, for instance, in the computation of a log probability of the previous interaction log occurring according to the current set of parameters. The log probability can be used in the accumulated reward distribution with respect to which optimization is performed, for example, when weighting the previous interaction log using various variants of importance sampling, as discussed below. The log probability can for instance occur in the accumulated reward distribution in a likelihood ratio of this log probability versus log probabilities of the previous interaction log occurring according to sets of parameters of interaction logs of the subset of the set of interaction logs. Regardless of how it occurs in the accumulated reward distribution, however, the approximated action probability may allow to approximate the accumulated reward distribution in such an efficient way that even large parameter spaces, such as those occurring in neural networks, can be navigated efficiently. Thereby parameters for better controlling the physical system can be found.

Hence, in various example embodiments of the present invention, a system for interacting with an environment can be configured by another system in such a way that the set of parameters is successfully and reliably learned, using fewer system interactions than using techniques known in the art. This is demonstrated with reference to FIGS. 8a-8c on a series of continuous control benchmark tasks.

In various embodiments, the physical system can comprise a robot, for example, a tool or machine used in a manufacturing process. The policy may be a controller for letting the robot execute a certain trajectory or other task. In such a case, sensors used may include a fall sensor, a joint position sensor, a camera, etcetera. The actuator can control, for example, an operating voltage of a physical component, e.g., an arm, of the robot. Embodiments herein provide for automatic training of such robots to best perform the task at hand.

Optionally, the set of parameters of the policy are iteratively optimized by a model-free policy gradient method. In other words, the loss function and/or its gradient may be directly estimated, e.g., using a technique known in the art as the "log-derivative trick" to compute the gradient, etc. This has as an advantage that only minimal assumptions are required to construct the surrogate model. In other embodiments, determining the updated set of parameters may further comprise optimizing a learned parametric critic model to further reduce the policy gradient variance. Various parameter critic models are convention in the related art on policy gradient methods.

Optionally, the policy may comprise a neural network, for example a deep neural network. Neural networks allow a broad class of behaviors to be captured efficiently and are amenable to various conventional optimization techniques, for example, by virtue of typically leading to differentiable loss functions. Different neural networks may be applicable to different kinds of environment interactions, e.g., the neural network may comprise a Long Short-Term Memory (LSTM) and/or a state-feedback controller, etc. The set of parameters may comprise one or more weights of the neural network that can thus be automatically optimized.

Optionally, the probability distribution for approximating the probability of the action of the previous interaction log may be centered around the action selected by the deterministic policy according to the current set of parameters. In other words, the expected value of the probability distribution may be equal to the action selected by the policy. Thereby, an approximation of the accumulated reward may be optimized that reflects the current policy but at the same time includes the uncertainty necessary to generalize to previously unseen policy parametrizations.

Optionally, the probability distribution comprises a Gaussian distribution. The covariance matrix of the Gaussian distribution may be independent from the current set of parameters, for example, it may be predetermined and/or set as a hyperparameter and/or determined through model selection. For example, the covariance matrix may be set to, or based on, the identity matrix times a constant. The constant may be seen as a length scale parameter indicating an amount of sharing between points of the parameter space. For example, a low value of the length scale parameter, e.g., with a log of −2, may indicate a relatively low amount of sharing whereas a higher value of the length scale parameter, for example, close to or equal to zero, may indicate a relatively high amount of sharing. The covariance matrix does not need to remain constant throughout the optimization, e.g., in various embodiments, the value of the length scale parameter defining the covariance matrix may be configured to decrease over time in order to gradually favor more local updates to the model and thereby better capture local effects. Because the covariance matrix is independent from the current set of parameters, it can be separately adjusted and/or optimized to better steer the optimization.

Optionally, determining the updated set of parameters may comprise selecting a (strict) subset of the set of interaction logs and optimizing the loss function, where the loss function is based on an accumulated reward distribution for the subset of the set of interaction logs. Since only a strict subset of the set of interaction logs is used, computational cost of the optimization is decreased, e.g., the optimization can scale to much larger sets of logs. Moreover, in effect, a stochastic optimization scheme is achieved. Since different interaction logs may be selected in different iterations, it may be prevented that the optimization gets stuck in local optima.

The subset can be selected in various ways. For example, interaction logs from one or more preceding iterations, e.g., the last x iterations for some fixed value x, can be selected. Such interaction logs have the advantage of being more likely to be relevant to the current set of parameters. Instead or in addition, one or more randomly selected previous iterations, e.g., a fixed amount, can be selected. Such interaction logs have the advantage of being able to better help the optimization escape local optima. The current interaction log can be included in the subset to more quickly integrate the new data into the set of parameters, but this is not necessary. The total number of selected interaction logs can remain fixed over the iterations, allowing the work performed per iteration to become substantially independent from the size of the overall set of interaction logs, or can be a fixed percentage of the size of the overall set, etc.

Optionally, selecting the subset of the set of interaction logs may comprise sampling an interaction log from the set of interaction logs, wherein an interaction log is sampled with a probability increasing with its accumulated reward. For example, the probability may be proportional with its accumulated reward, etc. Hence, a prioritized resampling of the support data, in the form of the interaction logs, is performed, thereby performing an exploration of the parameter space that favoring promising regions in the space of possible sets of parameters. In other words, backtracking to promising solutions is achieved. For example, selecting the subset of the set of interaction logs may comprises computing the probability of the interaction log being sampled according to a softmax distribution over the set of interaction logs. The accumulated rewards can be normalized and/or scaled according to temperature factor.

Optionally, the accumulated reward distribution may comprise a likelihood ratio of a log probability of the previous interaction log occurring according to the current set of parameters versus log probabilities of the previous interaction log occurring according to sets of parameters of interaction logs of the subset of the set of interaction logs. Such a ratio may correspond to an importance sampling estimate based on an empirical mixture distribution over the subset of the set of interaction logs. The action probability, as discussed above, can be comprised in this log probability. Although the likelihood ratio can be computed versus the log probabilities of all interaction logs, in accordance with the present invention, the ratio can also be computed just for a subset. This improves efficiency, especially because computing for each interaction log a ratio versus each other interaction log can scale badly, in some cases quadratically.

Optionally, the accumulated reward distribution may comprise a weighted sum of accumulated rewards of interaction logs, wherein the weighted sum is scaled according to a scaling factor comprising the sum of the weights. Such a weighted importance sampling estimator may further reduce the variance in computing loss functions based on the accumulated reward distribution. Such normalized importance sampling may in effect replace baseline terms employed for variance reduction in standard policy gradient methods.

Optionally, optimizing the loss function may comprise performing stochastic gradient descent and/or stochastic gradient Hamiltonian Monte Carlo optimization. These optimization methods may allow to determine the next set of parameters to be evaluated by the physical system relatively efficiently, especially when combined with a neural network-based policy. The Hamiltonian Monte Carlo optimization is a particularly good choice for the optimization method since it allows a multimodal search distribution and thereby allows to explore a richer set of behaviors of the system.

Optionally, optimizing the loss function comprises maximizing one or more of an expected accumulated reward, a lower bound on an expected accumulated reward, and a lower confidence bound on an accumulated reward. Optimizing lower bounds typically results in a more stable type of optimization, e.g., fewer unexpected sets of parameters may occur. Optimizing the expected accumulated reward is good for stimulating exploration. It is noted that the optimization may be heuristic and/or may result in a local optimum.

Optionally, the loss function may comprise a penalty decreasing in the effective sample size. The effective sample size may be indicative of how far the current set of parameters is away from known sets of parameters, for example, a higher effective sample size may indicate an increased confidence in the value of the accumulated reward. Using the penalty value, a type of lower bound on the expected accumulated award can be obtained. The penalty value may optionally be controlled by a penalty factor, e.g., a hyperparameter, in order to control exploration, e.g., following the objective estimate, versus risk awareness, e.g., staying within a trust region.

Optionally, the configuration system and the physical system may both be subsystems. For example, a single system may comprise both the configuration system and the physical system. The configuration system may also be a subsystem of the physical system. In such cases case, communication interfaces used by the configuration system and physical system may be internal communication interfaces. The configuration system and the physical system may each comprise separate data interfaces and/or processor subsystems, but the systems may also share a common data interfaces and/or a common processor subsystem.

It will be appreciated by those skilled in the art that two or more of the above-mentioned embodiments, implementations, and/or optional aspects of the present invention may be combined in any way deemed useful.

Modifications and variations of any computer-implemented method and/or any computer readable medium, which correspond to the described modifications and variations of a corresponding system, can be carried out by a person skilled in the art on the basis of the present description.

BRIEF DESCRIPTION OF THE DRAWINGS

These and other aspects of the present invention will be apparent from and elucidated further with reference to the embodiments described by way of example in the description below and with reference to the figures.

FIG. 5 shows a computer-implemented method of configuring a system, in accordance with an example embodiment of the present invention.

FIG. 6 shows a computer-implemented method of interacting with an environment according to a deterministic policy, in accordance with an example embodiment of the present invention.

FIG. 7 shows a computer-readable medium, in accordance with an example embodiment of the present invention.

It should be noted that the figures are purely diagrammatic and not drawn to scale. In the figures, elements which correspond to elements already described may have the same reference numerals.

DETAILED DESCRIPTION OF EXAMPLE EMBODIMENTS

Figure 1:
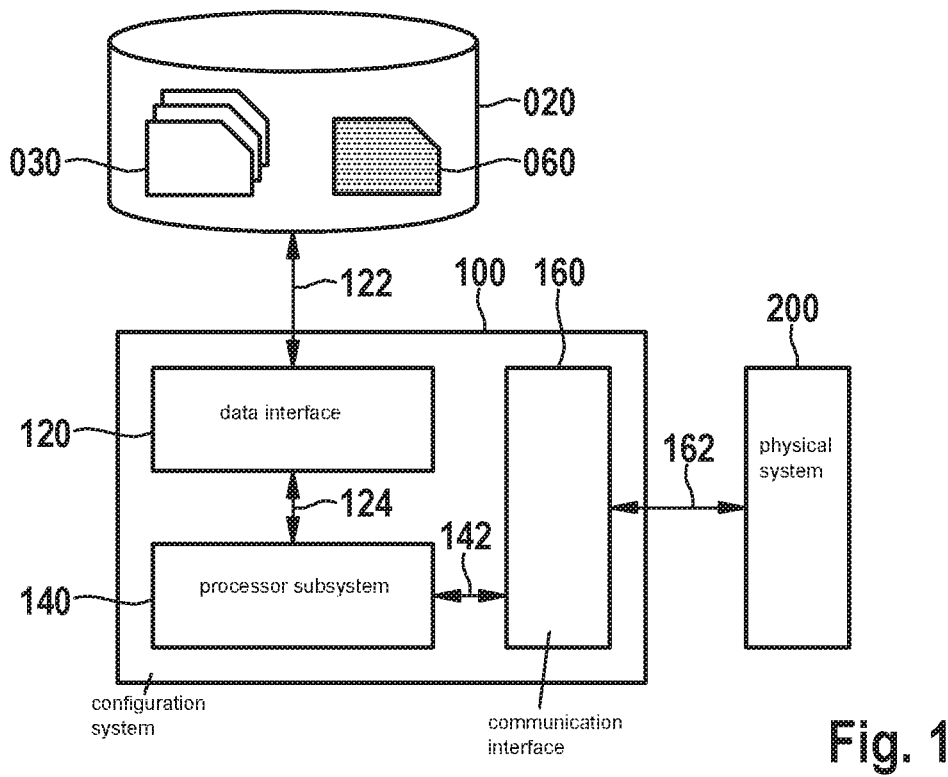
FIG. 1 shows a system for configuring another system which interacts with an environment according to a deterministic policy, in accordance with an example embodiment of the present invention.
Figure 2:
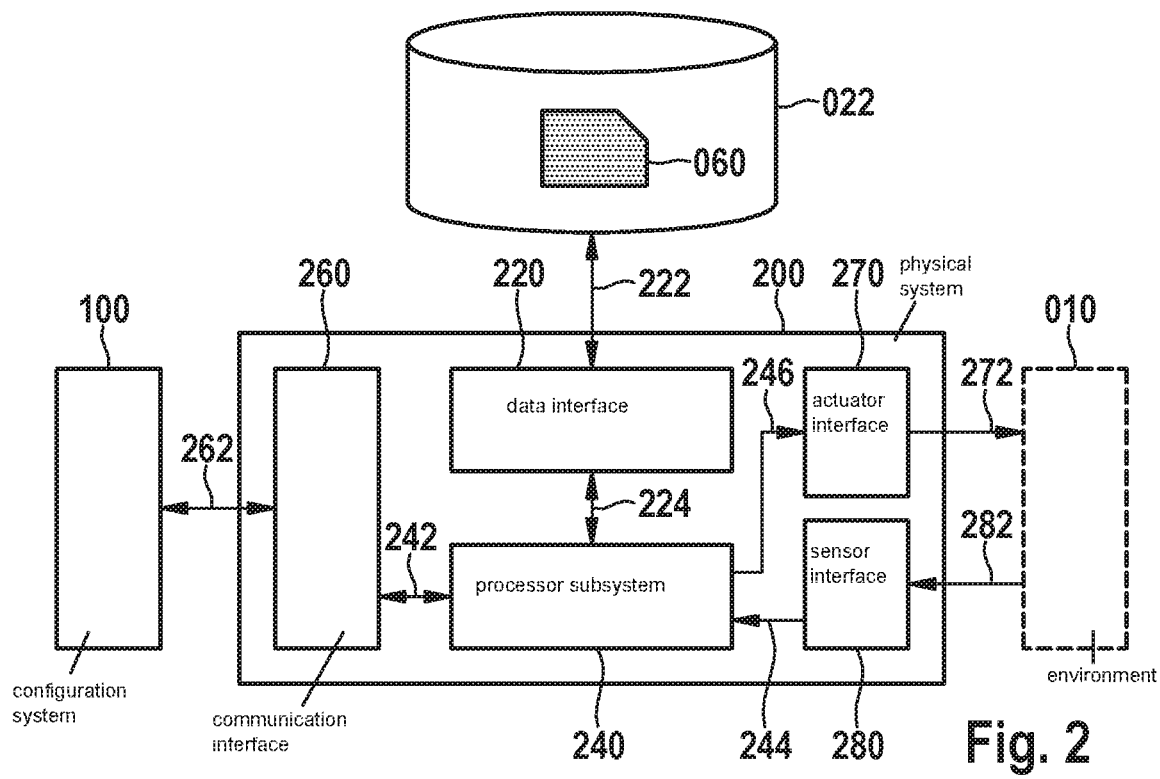
FIG. 2 shows a system for interacting with an environment according to a deterministic policy, in accordance with an example embodiment of the present invention.
Figure 3:
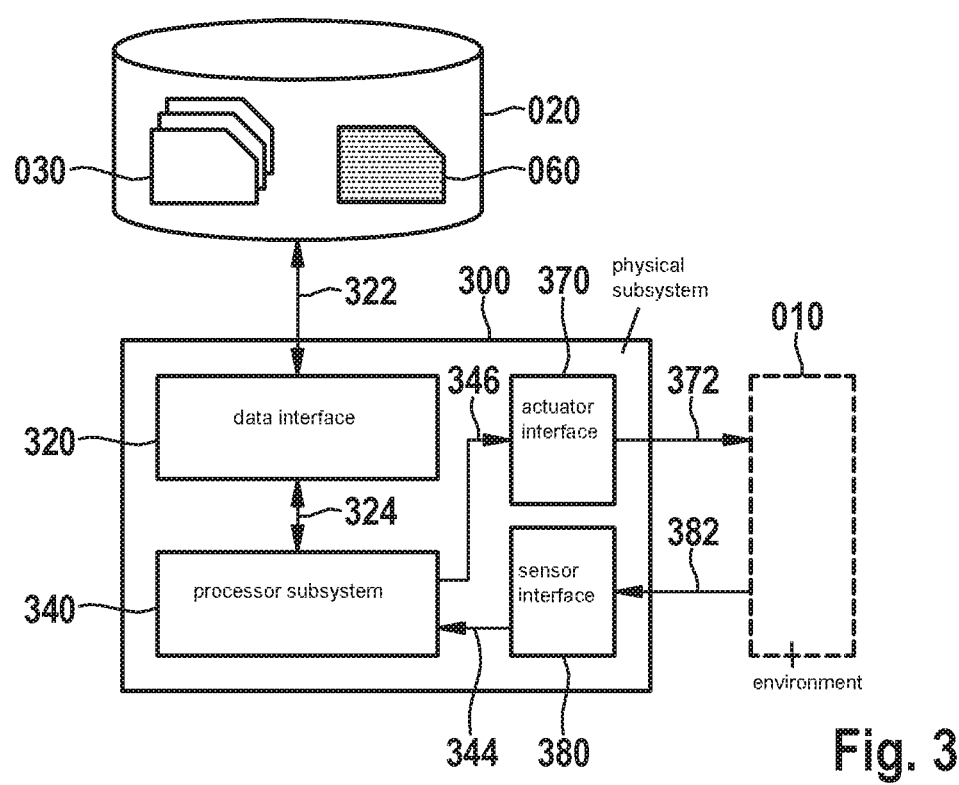
FIG. 3 shows a system which has a first subsystem for interacting with an environment and a second subsystem that configures the first subsystem, in accordance with an example embodiment of the present invention.

Various exemplary embodiments of the present invention are now provided. FIG. 1-FIG. 3 show examples of a configuration system, a physical system, and a system combining the two, respectively. Details of techniques to determine a set of parameters, e.g., to be used in combination with such systems, are discussed next with respect to FIG. 4.

FIG. 1 shows a configuration system 100 for configuring another system 200, e.g., a physical system. Other system 200 may be a system which interacts with an environment according to a deterministic policy. The policy may select an action of the other system 200 based on a state of the environment. The policy may be parametrized by a set of parameters.

The system 100 may comprise a data interface 120 and a processor subsystem 140 which may internally communicate via data communication 124. The processor subsystem 140 may be configured to, during operation of the system 100 and using the data interface 120, access a set 030 of interaction logs of other system 200 and/or a set 060 of current parameters of the policy. For example, as shown in FIG. 1, the data interface 120 may provide access 122 to an external data storage 020 which may comprise the data 030, 060. Alternatively, data 030, 060 may be accessed from an internal data storage which is part of the system 100. Alternatively, the data 030, 060 may be received via a network from another entity. In general, the data interface 120 may take various forms, such as a network interface to a local or wide area network, e.g., the Internet, a storage interface to an internal or external data storage, etc. The data storage 020 may take any conventional and suitable form.

The system 100 may also comprise a communication interface 160 configured for communication 162 with the other system 200. Communication interface 160 may internally communicate with processor subsystem 140 via data communication 142. Communication interface 160 may be arranged for direct communication with the other system 200, e.g., using USB, IEEE 1394, or similar interfaces. Communication interface 160 may also communicate over a computer network, for example, a wireless personal area network, an internet, an intranet, a LAN, a WLAN, etc. For instance, communication interface 160 may comprise a connector, e.g., a wireless connector, an Ethernet connector, a Wi-Fi, 4G or 4G antenna, a ZigBee chip, etc., as appropriate for the computer network. Communication interface 160 may also be an internal communication interface, e.g., a bus, an API, a storage interface, etc.

The processor subsystem 140 may be further configured to, during operation of the system 100, iteratively optimize the set of parameters 060 of the policy. Processor subsystem 140 may be configured to, in an iteration, obtain from the other system 200, via the communication interface 160, interaction data indicative of a sequence of states of the environment and of corresponding actions performed by the other system 200. Processor subsystem 140 may be configured to, in the iteration, store, as a current interaction log in the set of interaction logs 030, at least the interaction data and a current set of parameters of the policy according to which the actions were selected by the other system.

Processor subsystem 140 may further be configured to determine, in the iteration, an updated set of parameters 060 of the policy. Determining the updated set of parameters 060 may comprise optimizing a loss function based on an accumulated reward distribution with respect to the set of parameters 060. The accumulated reward distribution may be based on at least one previous interaction log determined in a previous iteration. The accumulated reward distribution may comprise an action probability of an action of the previous interaction log being performed according to the current set of parameters 060. This action probability may be approximated using a probability distribution defined by an action selected by the deterministic policy according to the current set of parameters 060. Processor subsystem 140 may be further configured to provide, in the iteration, the updated set of parameters 060 of the policy to the other system 200, e.g., via the communication interface 160.

Figure 4:
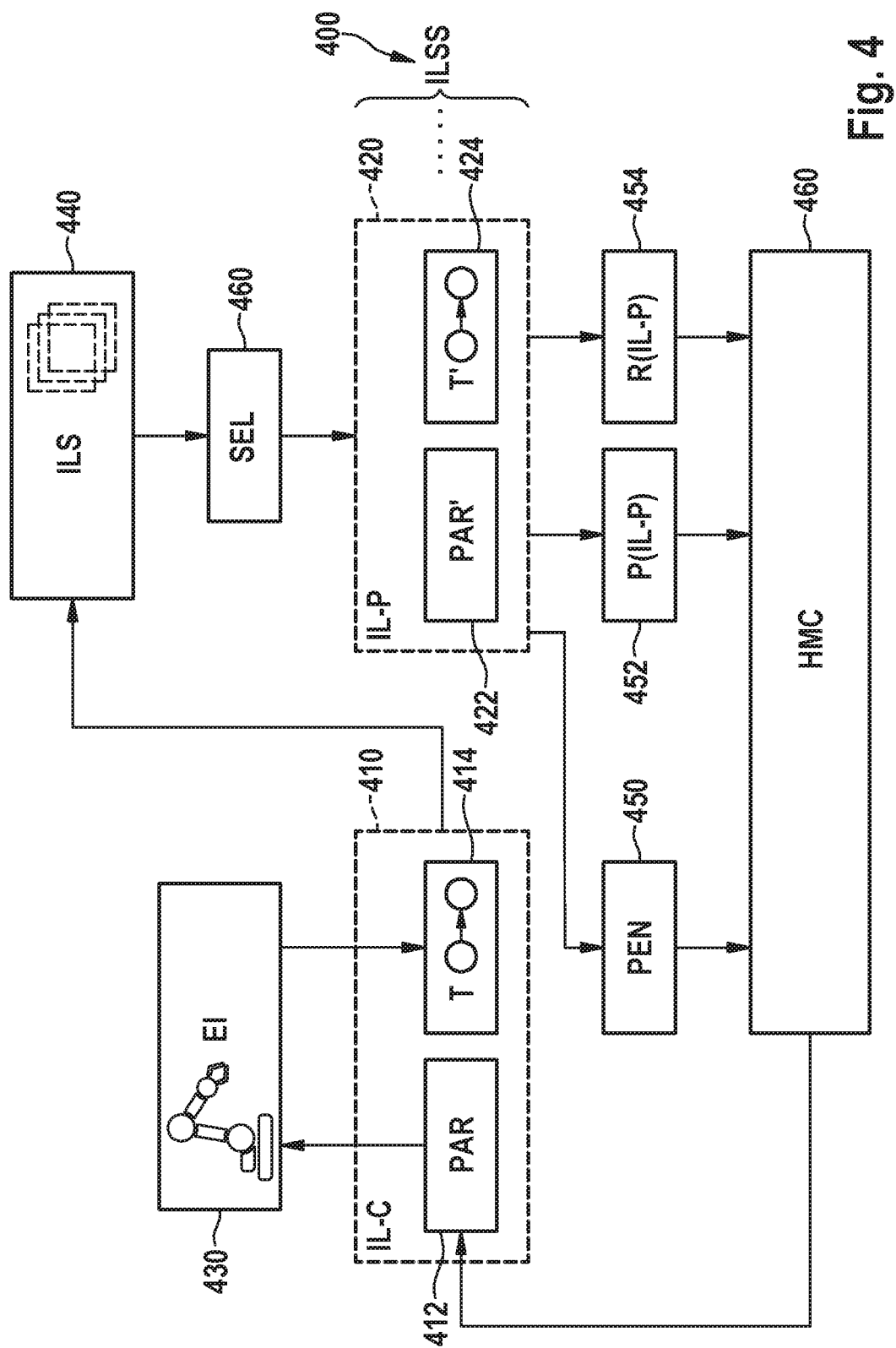
FIG. 4 shows a detailed example of how a set of parameters of a deterministic policy may be iteratively optimized based on previous interaction logs, in accordance with an example embodiment of the present invention.

Various details and aspects of the operation of the system 100 will be further elucidated with reference to FIG. 4, including optional aspects thereof.

In general, the system 100 may be embodied as, or in, a single device or apparatus, such as a workstation, e.g., laptop or desktop-based, or a server. The device or apparatus may comprise one or more microprocessors which execute appropriate software. For example, the processor subsystem may be embodied by a single Central Processing Unit (CPU), but also by a combination or system of such CPUs and/or other types of processing units. The software may have been downloaded and/or stored in a corresponding memory, e.g., a volatile memory such as RAM or a non-volatile memory such as Flash. Alternatively, the functional units of the system, e.g., the data interface and the processor subsystem, may be implemented in the device or apparatus in the form of programmable logic, e.g., as a Field-Programmable Gate Array (FPGA). In general, each functional unit of the system may be implemented in the form of a circuit. It is noted that the system 100 may also be implemented in a distributed manner, e.g., involving different devices or apparatuses, such as distributed servers, e.g., in the form of cloud computing. System 100 may be part of system 200 of FIG. 2.

FIG. 2 shows a physical system 200 for interacting with an environment 010 according to a deterministic policy. The policy may select an action of the system based on a state of the environment 010. The policy may be parametrized by a set of parameters 060. System 200 may be preconfigured with set of parameters 060, e.g., as previously determined by a configuration system such as system 100 of FIG. 1. For example, system 100 may have determined set of parameters 060 based on environment interactions of a system similar or identical to system 200. System 200 may also, for example, obtain set of parameters 060 and use it in multiple environment interactions. System 200 may also be configured to interact with a configuration system, e.g., system 100 of FIG. 1, to let the configuration system determine a set of parameters. In such a case, system 200 may repeatedly receive updated sets of parameters 060 to perform respective environment interactions with, as discussed in more detail below.

The system 200 may comprise a data interface 220 and a processor subsystem 240 which may internally communicate via data communication 224. The processor subsystem 240 may be configured to, during operation of the system 200 and using the data interface 220, access the set of parameters of the policy 060. For example, as shown in FIG. 2, the data interface 220 may provide access 222 to an external data storage 022 which may comprise the set of parameters 060. Alternatively, set of parameters 060 may be accessed from an internal data storage which is part of the system 200. Alternatively, the set of parameters 060 may be received via a network from another entity. In general, the data interface 220 may take various forms, such as a network interface to a local or wide area network, e.g., the Internet, a storage interface to an internal or external data storage, etc. The data storage 022 may take any known and suitable form.

In order to interact with the environment 010, the system 200 may comprise a sensor interface 280 and an actuator interface 270. System 200 may comprise or interact with a physical entity interacting with an environment 010, e.g., the physical entity can be a vehicle or a vehicle subsystem, a robot, etc., or a component of a connected or distributed system of physical entities, e.g., of a lighting system, or of any other type of physical system, e.g., a building.

The system 200 may comprise a sensor interface 280 for obtaining, from one or more sensors (not shown), sensor data 282 indicative of a state of the environment 010. Sensor interface 280 may internally communicate with processor subsystem 240 via data communication 244. In the following, for explanatory purposes, a single sensor is discussed. The sensor data 282 may comprise one or more physical quantities of the environment and/or the entity that interacts with it. In some embodiments, the sensor may be arranged in environment 010. In other examples, the sensor may be arranged remotely from the environment 010, for example if the quantity(s) can be measured remotely. For example, a camera-based sensor may be arranged outside of environment 010 but may nevertheless measure quantities associated with the environment, such as a position and/or orientation of the physical entity in the environment. Sensor interface 280 may also access the sensor data from elsewhere, e.g., from a data storage or a network location. Sensor interface 280 may have any suitable form, including but not limited to a low-level communication interface, e.g., based on I2C or SPI data communication, but also a data storage interface such as a memory interface or a persistent storage interface, or a personal, local or wide area network interface such as a Bluetooth, Zigbee or Wi-Fi interface or an ethernet or fiberoptic interface. The sensor may be part of system 200.

The system 200 may comprise an actuator interface 270 for providing, to one or more actuators (not shown), actuator data 272 causing the one or more actuators to effect an action in the environment 010. Actuator interface 270 may internally communicate with processor subsystem 240 via data communication 246. For ease of explanation, below, a single actuator is discussed. For example, the actuator may be an electric, hydraulic, pneumatic, thermal, magnetic and/or mechanical actuator. Specific yet non-limiting examples include electrical motors, electroactive polymers, hydraulic cylinders, piezoelectric actuators, pneumatic actuators, servomechanisms, solenoids, stepper motors, etc. The actuator may be part of system 200.

The processor subsystem 240 may be configured to, during operation of the system 200, control the interaction with the environment 010. Controlling the interaction with the environment may comprise repeatedly obtaining sensor data indicative of a current state 282 of the environment 010 from the sensor via the sensor interface 280; determining a current action 272 for the system 200 in the current state according to the policy; and providing actuator data 272 to the actuator causing the actuator to effect the current action in the environment via the actuator interface 270.

The set of parameters 060 of the policy may be determined by iteratively optimizing a loss function based on an accumulated reward distribution with respect to the set of parameters 060.

As discussed, set of parameters 060 have been optimized previously and may be received by, or preconfigured in, system 200. For example, the set of parameters may have been determined based on environment interactions with a system that has a similar or identical hardware configuration as system 200. Alternatively, set of parameters 060 may be a current set of parameters being determined in an iterative optimization process of another system, e.g., system 100 of FIG. 1. The accumulated reward distribution may comprise an action probability of an action of a previous interaction log being performed according to a current set of parameters. This action probability may be approximated using a probability distribution defined by an action selected by the deterministic policy according to the current set of parameters.

Optionally, the system 200 may comprise a communication interface 260 configured for communication 262 with a system 100 for configuring system 200, e.g., system 100 as discussed with respect to FIG. 1. Communication interface 260 may internally communicate with processor subsystem 240 via data communication 242. Processor subsystem 240 may be configured to receive the set of parameters 060 from system 100 via communication interface 260 and store the set of parameters 060, e.g., a current set of parameters that is being iteratively optimized by system 100. Processor subsystem 240 may be further configured to send interaction data indicative of the sequence of states and performed actions to the other system 100 via the communication interface 260. For example, the system may repeatedly receive the set of parameters 060 and send the interaction data, e.g., upon request by the other system 100. Communication interface 260 may correspond to communication interface 160, e.g., being configured for direct communication, communication over a computer network, internal communication.

Various details and aspects of the operation of the system 200 will be further elucidated with reference to FIG. 4, including optional aspects thereof.

In general, the system 200 may be embodied as, or in, a single device or apparatus, such as a workstation, e.g., laptop or desktop-based, or a server. The device or apparatus may comprise one or more microprocessors which execute appropriate software. For example, the processor subsystem may be embodied by a single Central Processing Unit (CPU), but also by a combination or system of such CPUs and/or other types of processing units. The software may have been downloaded and/or stored in a corresponding memory, e.g., a volatile memory such as RAM or a non-volatile memory such as Flash. Alternatively, the functional units of the system, e.g., the data interface and the processor subsystem, may be implemented in the device or apparatus in the form of programmable logic, e.g., as a Field-Programmable Gate Array (FPGA). In general, each functional unit of the system may be implemented in the form of a circuit. The system 200 may also be implemented in a distributed manner, e.g., involving different devices or apparatuses, such as distributed servers, e.g., in the form of cloud computing. In some embodiments, the system may be part of the system that interacts with environment, e.g., the robot, vehicle subsystem, lighting or heating system, etc.

FIG. 3 shows a system 300 comprising a physical subsystem for interacting with an environment 010 according to a deterministic policy and a configuration subsystem for configuring the first subsystem. For example, system 300 may comprise configuration system 100 and/or physical system 200 as subsystems. System 300 may comprise a sensor interface 380 for obtaining sensor data 382, e.g., based on sensor interface 280 of FIG. 2; and/or an actuator interface 370 for providing actuator data 372, e.g., based on actuator interface 270 of FIG. 2.

System 300 may also comprise a data interface 320 and a processor subsystem 340 which may internally communicate via data communication 324. The data interface and processor subsystem may be shared between the respective subsystems of system 300. The processor subsystem may be configured to perform the tasks of processor subsystems 140 and 240 discussed above. The data interface may provide access 322 to an external data storage 022 which may comprise set of interaction logs 030 and set of parameters 060 of the policy, e.g., based on data interface 120 or 220 discussed above. The physical subsystem and configuration subsystem may communicate with each other via a communication interface, which, in this case, may comprise data interface 320, e.g., to share, or have shared access to, the set of parameters 060 and/or the set of interaction logs 030. For example, Processor subsystem may store a determined updated set of parameters 060 of the policy using data interface 320, thereby providing the parameters to the physical subsystem, e.g., for performing a next interaction with the environment. Sensor interface 380 and actuator interface 370 may internally communicate with processor subsystem 340 via data communication 344, 346.

FIG. 4 shows a detailed yet non-limiting example of how a physical system which interacts with an environment according to a deterministic policy may be configured by a configuration system. For example, the techniques of FIG. 4 may be applied by configuration system 100 of FIG. 1 to configure a physical system, e.g., physical system 200 of FIG. 2. The techniques of FIG. 4 may also be applied, for example, by a system 300 that has a configuration system and physical system as subsystems. FIG. 4 provides a functional partitioning of operations performed by a processor subsystem of such systems. Environment interaction EI, 430, of FIG. 4 representing the environment interaction by the physical system being configured.

As shown in the figure, a set of parameters PAR, 412, of the policy may be iteratively optimized. Generally speaking, optimizing the set of parameters PAR may comprise learning the policy by reinforcement learning. Mathematically, various embodiments can be seen as an instance of an episodic reinforcement learning problem in a discrete-time Markovian environment. Mathematically, such a reinforcement learning problem may be phrased in terms of a discrete-time Markov Decision Process, or MDP. Such an MDP may for example be described by a tuple $\mathcal{M} = (\mathcal{S}, \mathcal{A}, p, r, \gamma, p_0)$, various components of which are discussed below.

In an iteration, an environment interaction EI, 430, according to the current set of parameters PAR may be performed, e.g., by physical system 200 of FIG. 2 or by system 300 of FIG. 3. An environment interaction may be controlled by repeatedly obtaining sensor data indicative of a current state of the environment from a sensor; determining a current action for the system in the current state according to the policy based on the current set of parameters PAR; and providing actuator data to an actuator causing the actuator to effect the current action in the environment, as discussed with respect to systems 200 and 300 above. For example, the interaction may comprise a fixed number of actions according to a predefined horizon length, and/or interactions may be performed until a predefined stopping criterion is reached, e.g., as a function of one or more of the number of performed actions, the current and previous actions, and the current and previous environment states.

Environment interactions EI according to various embodiments may be described more mathematically as follows. A set $\mathcal{S}$ may capture a set of states of the environment, e.g., as inferred from sensor measurements. As part of environment interaction EI, state $s_t \in \mathcal{S}$ of the environment may transition according to a performed action $a_t \in \mathcal{A}$ according to transition probabilities $p(s_{t+1}|s_t, a_t)$ into a successor state. In traditional reinforcement learning, environment interaction is according to a stochastic policy $\pi_\theta = \pi(a_t|s_t; \theta)$, parameterized by a set of parameters $\theta$. In various embodiments, however, a deterministic policy $\pi_\theta$ is used in environment interaction EI, e.g., policy $\pi_\theta$ may be a function $a_t = \pi_\theta(s_t; \theta)$ selecting an action $a_t$ of the system based on a state $s_t$ of the environment parametrized by a set of parameters $\theta$, PAR.

In various embodiments, function $\pi_\theta$ comprises a neural network, e.g., a deep neural network. Set of parameters PAR may in this case comprise one or more weights of the neural network. However, various other types of policies and corresponding sets of parameters are possible, e.g., the policy may comprise a proportional-integral-derivative controller, or PID controller, with set of parameters PAR providing one or more coefficients for the proportional, integral, and/or derivative terms of the controller. As another example, the policy may comprise a linear state-feedback controller, e.g., with set of parameters PAR providing one or more entries of a feedback matrix of the controller. Typically, as in the above examples, the policy is differentiable with respect to parameters PAR.

Environment interaction EI may lead to a sequence T, 414, of states of the environment and corresponding performed actions, also known as a trajectory. At least the trajectory T and the set of parameters PAR of the policy according to which the actions were selected may form a current interaction log IL-C, 410. Current interaction log IL-C may be stored in set of interaction logs ILS, 440.

Stored with or at least associated to an interaction log in the set ILS of interaction logs may be its accumulated reward, sometimes simply referred to as return or as path return. The accumulated reward of an environment interaction may be indicative of a success of an action of environment interaction EI. For example, as discussed below, the set of parameters PAR may be optimized in such a way that an expected accumulated reward of performing environment interactions according to the policy is maximized. The accumulated reward is typically computed based on a reward function. The reward function, e.g., $r: S \times A \to \mathbb{R}$, may provide a reward of performing a given action in a given state. An accumulated reward $R(\tau)$ of an interaction log, e.g., log IL-C, is typically determined from its trajectory, e.g. sequence of state-action pairs $\tau = (s_0, a_0, \ldots, s_H, a_H)$, T, by summing rewards of the respective actions according to a discount factor γ and/or accumulated over a horizon length H, e.g., $R(\tau)=\Sigma_{t=0}^{H-1}\gamma^t r(s_{\tau,t}, a_{\tau,t})$. The reward function r, discount factor γ, and/or horizon length H may be predefined.

In an iteration of the iterative optimization, an updated set of parameters PAR may be determined by optimizing a loss function based on an accumulated reward distribution with respect to the set of parameters PAR. Interestingly, the accumulated reward distribution may be based on at least one previous interaction log IL-P, 420, allowing knowledge about the environment gained from previous interactions to be more effectively used and thereby reducing the number of environment interactions needed. Such a previous interaction log may comprise a trajectory T', 424, and a set of parameters PAR', 422, according to which the previous interaction was performed. Since the parameters PAR' are generally different from current parameters PAR, previous interaction log IL-P may be regarded as a so-called off-policy sample with respect to current set of parameters PAR. Typically, stored or associated with previous interaction-log IL-P is also its accumulated reward R(IL-P), 454, as discussed above.

Although it is possible to use all previous interaction logs, interestingly, in various embodiments, the optimization may be performed stochastically in the sense that the optimization is performed with respect to a subset ILSS, 400, of the set of interaction logs. In other words, determining the updated set of parameters PAR may comprise selecting SEL, 460, a subset of the set of interaction logs ILS and optimizing the loss function based on subset ILSS. Typically, ILSS comprises multiple interaction logs, including previous interaction log IL-P and possibly also current interaction log IL-C. As discussed above, taking a subset, e.g., a strict subset, of the set of interaction logs ILS is beneficial for reasons of performance and/or in order to foster exploration and facilitate escaping from local optima. However, it is noted that taking a subset is not necessary and, for example, subset ILSS can also be chosen equal to the set of interaction logs ILS, e.g., including current interaction log IL-C.

Various selection criteria may be used perform selection SEL of the subset of interaction logs. Typically, the number of selected interaction logs is predefined, say, a number of $N_{max}$ interaction logs is selected. It is generally beneficial to sample an interaction log with a probability that increases with its accumulated reward. This way, promising regions in parameter space may be explored more. For example, an interaction log may be selected with a probability according to a softmax distribution over the set of interaction logs ILS. Concretely, a set of $N_{max}$ interaction logs may be drawn from a softmax distribution over the set of available interaction logs ILS, also denoted $\mathcal{J}$ below, based on their accumulate rewards. In some embodiments, before taking the softmax, the rewards may first be normalized, e.g., such that the empirical distribution over the normalized rewards $\tilde{R}$ has mean zero and standard deviation one. In some embodiments, the softmax computation also takes into account a temperature factor λ to trade off exploration against exploitation in the selection of interaction logs. Normalization and use of the temperature factor can also be combined. For example, a probability of an interaction log being sampled may be given as:

$$p(\mathcal{J} \mid \tau_1, \ldots, \tau_N) = \frac{\exp(\tilde{R}(\tau_\mathcal{J})/\lambda)}{\sum_{j=1}^N \exp(\tilde{R}(\tau_j)/\lambda)}.$$

In various embodiments, subset ILSS comprises at least a predefined number of most recent interaction logs, e.g., the five most recent interaction logs, e.g., including the current interaction log IL-C, and/or a number of selected interaction logs, e.g., according to the softmax distribution as detailed above.

Proceeding now to the optimization being performed based on set ILSS of interaction logs. As discussed, a loss function based on an accumulated reward distribution may be optimized with respect to the set of parameters PAR. The accumulated reward distribution may, in various embodiments, be stochastically approximated based on a subset of interaction logs including a log IL-P of a previous interaction. In that sense, the approximation of the accumulated reward distribution may be regarded as surrogate model of the accumulated reward distribution.

In various embodiments, in order to incorporate previous interaction log IL-P in the accumulated reward distribution, the accumulated reward distribution may comprise an action probability P(IL-P), 452, of an action of the previous interaction log being performed according to the current set of parameters. The probability of the action being performed may be in the state in which the action was performed according to the previous interaction log. Action probability P(IL-P) may allow to compensate for a difference between the set of parameters PAR' used to obtain previous interaction log IL-P, and the current set of parameters PAR.

For example, in various embodiments, previous interaction logs ILSS are weighted in the accumulated reward distribution according to an empirical mixture distribution. For example, denoting the previous interaction logs as $\mathcal{D}=\{(\tau_i, \theta_i)\}_{i=1}^N$, the empirical mixture distribution may be defined as $q(\tau|\theta_1, \ldots, \theta_N)=1/N\Sigma_i p(\tau|\theta_i)$. Action probability P(IL-P) may be comprised the weight of the previous interaction log IL-P. Effectively, previous interaction logs may be treated as being i.i.d. draws from the empirical mixture distribution $\tau_i \sim q(\tau|\theta_1, \ldots, \theta_N)$.

Specifically, when using an empirical mixture distribution, the accumulated reward distribution may comprise the accumulated reward R(IL-P) of previous interaction log IL-P weighted according to a likelihood ratio of a log probability $p(\tau|\theta)$ of the previous interaction log IL-P occurring according to current set of parameters PAR, 412, versus log probabilities of the previous interaction log IL-P occurring according to sets of parameters of interaction logs of subset ILSS of the set of interaction logs, e.g., an average $1/N\Sigma p(\tau|\theta_i)$ of these probabilities. Action probability P(IL-P) may be comprised in this weight. For example, an importance weight may be given by:

$$W(\tau, \theta) = \frac{\prod_{t=0}^H \pi(a_t \mid s_t; \theta)}{\frac{1}{N}\sum_j \prod_{t=0}^H \pi(a_t \mid s_t; \theta_j)}.$$

It may be thought that the above weights cannot be applied for deterministic policies, e.g., because in a deterministic policy, the probabilities $\pi(a_t|s_t; \theta)$ of performing an action $a_t$ in a state $s_t$ given a set of parameters θ is zero or one. It was an insight of the inventors that the importance weights above can still be used by approximating the probabilities using probability distributions defined by actions selected by the deterministic policy. Thus, probability P(IL-P), 452, $\pi(a_t|s_t; \theta)$, of an action of the previous interaction log being performed according to the current set of parameters may be approximated using a probability distribution defined by an action $\pi_\theta(s_t)$ selected by the deterministic policy according to the current set of parameters PAR, $\theta$. More generally, any probability $\pi(a_t|s_t; \theta_j)$ of an actions of a first interaction log being performed according to a set of parameters corresponding to a second interaction log may be approximated in this way, e.g., using a probability distribution defined by an action selected by the deterministic policy according to the set of parameters corresponding to the second interaction log.

The probability distribution used to approximate the action probabilities is typically centered around the action $\pi_\theta(s_t)$ selected by the deterministic policy, and can for instance comprise a Gaussian distribution with a covariance matrix that is independent from the current set of parameters PAR. Mathematically, the evaluation policy may be as follows:

$$\tilde{p}(a_t|s_t; \theta) = \mathcal{N}(a_t|\pi_\theta(s_t), \Sigma).$$

For instance, covariance matrix $\Sigma$ may be set to $\Sigma = \mathrm{diag}(\sigma_1, \ldots, \sigma_{D_q})$, e.g., $\Sigma$ may be a diagonal covariance matrix.

Mathematically, for example, a possible expected accumulated reward with respect to which the set of parameters PAR can be optimized, is:

$$\hat{J}^{surr}(\theta) = \frac{1}{N} \sum_{i=1}^{N} \tilde{w}(\tau_i, \theta) R(\tau_i),$$

where $\tau_i$ are trajectories of selected interaction logs ILSS, $\tau$ is the current set of parameters PAR, and importance weights $\tilde{w}(\tau_i, \theta)$ are $$\tilde{w}(\tau_i, \theta) = \frac{\prod_{t=0}^{H} \mathcal{N}(a_t^{(i)}|\pi_\theta(s_t^{(i)}), \Sigma)}{\frac{1}{N}\sum_{j=0}^{N}\prod_{t=0}^{H} \mathcal{N}(a_t^{(i)}|\pi_{\theta_j}(s_t^{(i)}), \Sigma)}.$$

Possible choices for normalization constant Z include setting Z=N and setting $Z = \sum_{i=1}^{N} \tilde{w}(\tau_i, \theta)$ as a sum of the importance weights. The latter in effect performs a weight normalization, which is beneficial for reducing the variance of the estimate, although it may add bias to the estimator.

From the above expressions, it may be observed that the computation of importance weights $\tilde{w}(\tau_i, \theta)$ given above can scale quadratically with the number of trajectories used due to the summation over the likelihoods of all trajectories given all available policies. Especially when the policy is relatively complex, e.g., comprising a deep neural network or similar, selecting a relatively small subset ILSS of the set of interaction logs is particularly beneficial by enabling scaling to much larger datasets. Moreover, as discussed, selecting a small subset helps to avoid local minima by effectively stochastically optimizing the objective.

In various embodiments, covariance matrix $\Sigma$ can be predefined or even varied throughout the optimization to achieve various effects. For example, setting $\Sigma$ close to the all-zero matrix can result in a behaviour that approaches a normal Monte Carlo estimator of the expected return. On the other hand, making $\Sigma$ large makes results in an approximation similar to taking the average over all available interaction logs. Varying hyper-parameter $\Sigma$ thereby allows to interpolate between how much information is shared between neighboring policies and/or control the amount of bias in the surrogate model.

Choosing a length-scale $\Sigma$ in action space, in other words, approximating the probability of performing an action as above, is advantageous from another perspective as well. In practice, return distributions frequently exhibit sharp transitions between stable and unstable regions, where policy parameters change only slightly but reward changes drastically. One global length-scale may therefore typically not be well suited to directly model the expected return. This is a common problem in Bayesian Optimization for reinforcement learning, where typical smooth kernel functions, e.g., squared exponential kernel, with globally fixed length-scales can be unable to model both stable and unstable regimes at the same time. However, by using a probability distribution defined by an action according to the current set of parameters, in other words, in action space, a length-scale in this action space may in effect be translated via the sampled state distribution and policy function into implicit assumptions in the actual policy parameter space. Hence, instead of operating on arbitrary Euclidean distances in policy parameter space, a more meaningful distance in trajectory and action space may be obtained. As a consequence, the accumulated reward distribution is more accurately represented, which may lead to faster convergence.

The use of an empirical mixture distribution allows to effectively re-use past experience, thereby improving data-efficiency. However, it is not necessary to use the empirical mixture distribution, e.g., instead importance sampling can be used to weight the previous interaction log according to the current set of parameters. In this case, action probability P(IL-P) may occur in a likelihood ratio of a log probability of the previous interaction log occurring according to the current set of parameters versus a log probabilities of the previous interaction log occurring according to the set of parameters PAR' of the interaction log. This type of importance sampling may be more computationally efficient, at the price of making less effective use of the past experience. Regardless of whether the empirical mixture distribution or another type of importance sampling with respect to current set of parameters PAR is used though, in either case the accumulated reward distribution typically comprises action probability P(IL-P), which can be approximated as discussed.

In various embodiments, optimizing the loss function based on the accumulated reward distribution with respect to the set of parameters comprises maximizing an expected accumulated reward as discussed above, e.g., maximizing approximated accumulated reward $\hat{J}^{surr}(\theta)$ for the empirical mixture distribution. In other embodiments, a lower bound on the expected accumulated reward or a lower confidence bound on the accumulated award is maximized, e.g., in order to increase stability of the optimization.

For example, in order to maximize a lower bound on the expected accumulated reward, a penalty value PEN, 450, decreasing in the effective sample size (ESS) may be employed. The effective sample size may be indicative of the effective number of available data points at a specific policy evaluation position, so the lower the effective sample size, the more uncertainty there is, and the more the set of parameters is be penalized.

Specifically, penalty value PEN may be based on the following estimator of the estimated effective sample size:

$$\hat{E}SS = \frac{1}{\sum_{i=1}^{N} \tilde{w}(\tau_i, \theta)^2}$$

Based on this estimated effective sample size, the following lower bound estimate of the expected return can be obtained:

$$E_{\tau \sim p(\tau|\theta)}[R(\tau)] \geq \frac{1}{N} \sum_{i=1}^{N} w(\tau_i, \theta) R(\tau_i) - \|R\|_\infty \sqrt{\frac{1-\delta}{\delta} Ess(\theta)^{-1}}.$$

This estimate comprises confidence parameter δ indicative of how far the optimization may step away from known regions of the parameter space. Penalty value PEN may be defined based on the estimated effective sample size as follows:

$$\text{penalty}(\theta) = -\|R\|_\infty \gamma' \sqrt{\hat{E}SS(\theta)^{-1}}.$$

As demonstrated here, penalty value PEN may comprise a penalty factor γ', e.g., a hyperparameter to balance following the objective estimate vs. risk awareness, e.g., staying within a trust region.

In order to optimize the loss function with respect to set of parameters PAR, various optimization techniques may be employed. In the figure, stochastic gradient Hamiltonian Monte Carlo optimization HMC, 460, is used to determine set of parameters PAR, which may provide improved exploration behavior because it in effect provides a multimodal search distribution, allowing a richer set of behaviors to be explored. In other embodiments, optimization is performed by stochastic gradient descent. In yet other embodiments, the Adam optimizer is used as described in "Adam: A Method for Stochastic Optimization" by Diederik P. Kingma and Jimmy Ba (available at https://arxiv.org/abs/1412.6980 and incorporated herein by reference). In still other embodiments, optimization is done with a natural policy gradient method.

As an illustrative example, an algorithm is now presented to iteratively optimize the set of parameters according to an embodiment. As this algorithm demonstrates, using a deterministic policy in combination with selecting a subset of the set of interaction logs, e.g., using the softmax replay selection discussed above, enables to incorporate interaction logs not just from the current iteration but also from previous ones, improving data inefficiency. In the algorithm below, lower bound $$\text{argmax}_\theta J(\theta) - \text{penalty}(\theta)$$

on the expected accumulated award is optimized, but other loss functions are possible as well, e.g., expected accumulated award $$\text{argmax}_\theta J(\theta)$$

without a penalty value.

```
Algorithm. Model-free DD-OPG
Input: Initial policy parameters θ₀
empty interaction log: 𝒟₀ = { }
repeat
    interact with environment to sample trajectory: τᵢ ~ p( τ|θᵢ)
    update interaction log: 𝒟ᵢ₊₁ = 𝒟ᵢ ∪ (τᵢ, Rᵢ, θᵢ)

select subset of set of interaction logs: i₁, ... ,
    i_{N_max} ~^{iid} p(𝒥 | τ₁, ... , τᵢ₊₁)

surrogate model: J̃(θ), penalty(θ)

lower bound optimization of set of parameters: θᵢ₊₁ = argmax_θ J̃(θ) −
    penalty(θ)

until converged or maximum iterations
```

FIG. 5 shows a block-diagram of a computer-implemented method 500 of configuring a system which interacts with an environment according to a deterministic policy. The policy may select an action of the system based on a state of the environment. The policy may be parametrized by a set of parameters. The method 500 may correspond to an operation of the system 100 of FIG. 1 or the system 300 of FIG. 3. However, this is not a limitation, in that the method 500 may also be performed using another system, apparatus or device. The system being configured may be, for example, system 200 or a physical subsystem of system 300.

The method 500 may comprise, in an operation titled "COMMUNICATING WITH SYSTEM", communicating 510 with the system. The method 500 may further comprise, in an operation titled "ACCESSING LOGS", accessing 520 a set of interaction logs of the system. The method 500 may further comprise, in an operation titled "OPTIMIZING PARAMETERS", iteratively optimizing 570 the set of parameters of the policy.

In an iteration of operation 570, the method 500 may comprise, in an operation titled "OBTAINING STATES, ACTIONS", obtaining 530 from the system interaction data indicative of a sequence of states of the environment and of corresponding actions performed by the system. In an iteration of operation 570, the method 500 may further comprise, in an operation titled "STORING AS CURRENT LOG", storing 540, as a current interaction log in the set of interaction logs, at least the interaction data and a current set of parameters of the policy according to which the actions were selected by the system. In an iteration of operation 570, the method 500 may further comprise, in an operation titled "DETERMINING UPDATED PARAMETERS", determining 550 an updated set of parameters of the policy by optimizing a loss function based on an accumulated reward distribution with respect to the set of parameters. The accumulated reward distribution may be based on at least one previous interaction log determined in a previous iteration. The accumulated reward distribution may comprise an action probability of an action of the previous interaction log being performed according to the current set of parameters. This action probability may be approximated using a probability distribution defined by an action selected by the deterministic policy according to the current set of parameters. In an iteration of operation 570, the method 500 may further comprise, in an operation titled "PROVIDING PARAMETERS", providing 560 to the system the updated set of parameters of the policy.

FIG. 6 shows a block-diagram of a computer-implemented method 600 of interacting with an environment according to a deterministic policy. The policy may select an action based on a state of the environment. The policy may be parametrized by a set of parameters. The method 600 may correspond to an operation of the system 200 of FIG. 2 or a physical subsystem system 300 of FIG. 3. However, this is not a limitation, in that the method 600 may also be performed using another system, apparatus or device.

The method 600 may comprise, in an operation titled "ACCESSING PARAMETERS", accessing 610 the set of parameters of the policy. The method 600 may further comprise, in an operation titled "CONTROLLING INTERACTION", controlling 620 the interaction with the environment.

Operation 620 may comprise repeatedly performing one or more of the following operations. In an operation titled "OBTAINING STATE", operation 620 may comprise obtaining 630, from a sensor, sensor data indicative of a current state of the environment. In an operation titled "DETERMINING ACTION", operation 620 may comprise determining 640 a current action in the obtained state according to the policy. The set of parameters of the policy may be determined by iteratively optimizing a loss function based on an accumulated reward distribution with respect to the set of parameters. The accumulated reward distribution may comprise an action probability of an action of a previous interaction log being performed according to a current set of parameters. This action probability may be approximated using a probability distribution defined by an action selected by the deterministic policy according to the current set of parameters. In an operation titled "PROVIDING ACTION TO ACTUATOR", operation 620 may comprise providing 650, to an actuator, actuator data causing the actuator to effect the current action in the environment.

It will be appreciated that, in general, the operations of method 500 of FIG. 5 and method 600 of FIG. 6 may be performed in any suitable order, e.g., consecutively, simultaneously, or a combination thereof, subject to, where applicable, a particular order being necessitated, e.g., by input/output relations.

The method(s) may be implemented on a computer as a computer implemented method, as dedicated hardware, or as a combination of both. As also illustrated in FIG. 7, instructions for the computer, e.g., executable code, may be stored on a computer readable medium 700, e.g., in the form of a series 710 of machine-readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 7 shows an optical disc 700.

Alternatively, the computer readable medium 700 may comprise transitory or non-transitory data 710 representing a set of parameters of a deterministic policy for a system interacting with an environment, wherein the set of parameters of the policy is determined by iteratively optimizing a loss function based on an accumulated reward distribution with respect to the set of parameters, the accumulated reward distribution comprising an action probability of an action of the previous interaction log being performed according to the current set of parameters, wherein the action probability is approximated using a probability distribution defined by an action selected by the deterministic policy according to the current set of parameters.

Figure 8A:
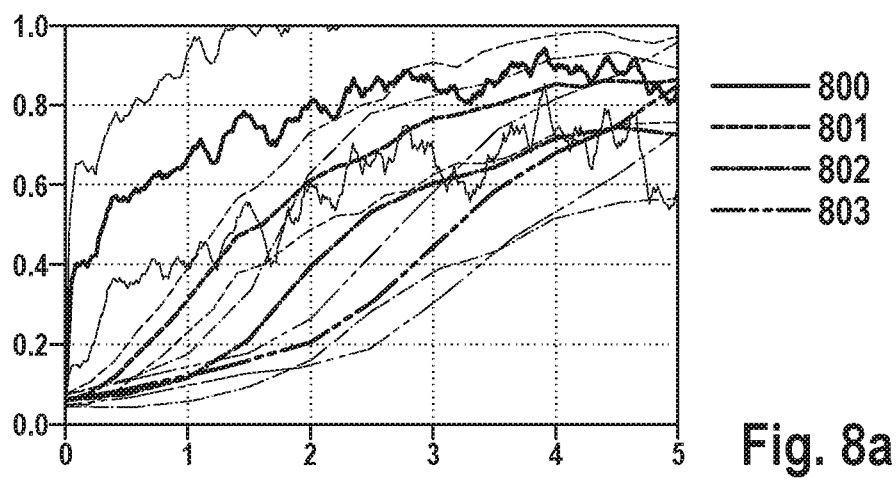
FIGS. 8*a-c* show benchmark results for parameter optimization, in accordance with an example embodiment of the present invention.
Figure 8B:
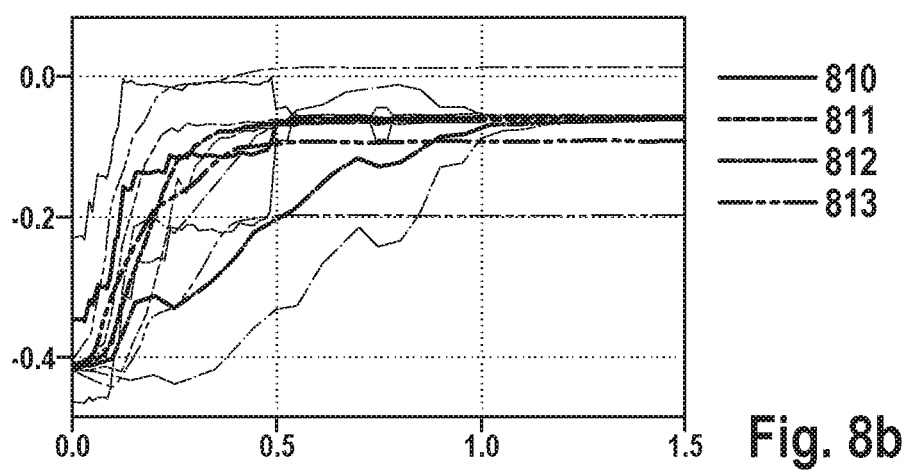
Figure 8C:
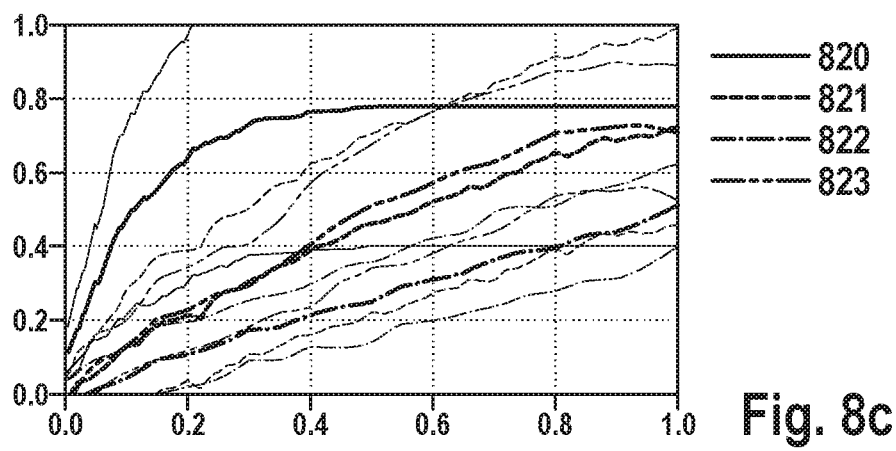

FIGS. 8a-8c show experimental results of configuring systems for interacting with an environment according to an embodiment. The experimental results highlight advantages of the techniques presented herein in terms of data-inefficiency and learning progress versus state-of-the-art policy gradient methods.

The figures show learning performance for the environments "cartpole" (FIG. 8a), "mountaincar" (FIG. 8b), and "swimmer" (FIG. 8c) as described in Y. Duan et al., "Benchmarking Deep Reinforcement Learning for Continuous Control" (available at https://arxiv.org/abs/1604.06778 and incorporated herein by reference insofar as concerning the description of these tasks). The benchmarks represent continuous control problems. In "cartpole", an inverted pendulum is mounted on a pivot point on a cart. The task is to move the cart to keep the pendulum upright. In "mountaincar", a car has to escape a valley by repetitively applying tangential forces. In "swimmer", a planar robot with three links and two actuated joints has to swim as fast as possible.

Thick lines 800-803, 810-813, 820-823 show the mean of the average return of four different methods on the respective environments. Two thinner lines corresponding to each of the thick lines are shown, corresponding to one standard deviation above or below the average return. The values are obtained from 10 independent random seeds. The values are plotted as a function of the number of system interaction steps, scaled by $10^5$. Lines 800, 810, 820 show the performance of the methods presented in this specification. Lines 801, 811, 821 show the performance of the PPO method as described in J. Schulman et al., "Proximal policy optimization algorithms" (available at https://arxiv.org/abs/1707.06347 and incorporated herein by reference). Lines 802, 812, 822 show the performance of the TRPO method as described in J. Schulman et al., "Trust region policy optimization" (available at https://arxiv.org/abs/1502.05477 and incorporated herein by reference). Lines 803, 813, 823 show the performance of standard REINFORCE, as described in R. J. Williams, "Simple statistical gradient-following algorithms for connectionist reinforcement learning", Springer, 1992 (incorporated herein by reference).

Significant faster learning speed in the beginning is observed for the present method 800, 810, 820 in comparison to the state of the art 801-803, 811-813, 821-823. Using the techniques described herein, rapid learning progress may be achieved already after few interactions and the final performance of the competitive, state-of-the-art policy gradient methods may be at least matched. Incorporating previously seen rollout data in the form of previous interaction logs enables rapid progress especially in the early stages of training. Hence, with the same amount of environment interactions, better sets of parameters may be obtained, and/or fewer environment interactions are needed to get the same quality.

Examples, embodiments or optional features, whether indicated as non-limiting or not, are not to be understood as limiting the present invention.

It should be noted that the above-mentioned embodiments illustrate rather than limit the present invention, and that those skilled in the art will be able to design many alternative embodiments without departing from the scope of the present invention. Use of the verb "comprise" and its conjugations does not exclude the presence of elements or stages. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The present invention may be implemented by means of hardware comprising several distinct elements, and by means of a suitably programmed computer. In the example device enumerating several means, several of these means may be embodied by one and the same item of hardware. The mere fact that certain measures are recited in mutually separately does not indicate that a combination of these measures cannot be used to advantage.

What is claimed is:

1. A system for configuring another system which interacts with an environment according to a deterministic policy, the policy selecting an action of the other system based on a state of the environment, the policy being parametrized by a set of parameters, the system comprising:
   a communication interface configured for communication with the other system;
   a data interface configured to access a set of interaction logs of the other system;
   a processor subsystem configured to iteratively optimize the set of parameters of the policy, by, in an iteration:
      obtaining from the other system, via the communication interface, interaction data indicative of a sequence of states of the environment and of corresponding actions performed by the other system;
      storing, as a current interaction log in the set of interaction logs, at least the interaction data and a current set of parameters of the policy according to which the actions were selected by the other system;
      determining an updated set of parameters of the policy, wherein determining the updated set of parameters includes optimizing a loss function based on an accumulated reward distribution with respect to the set of parameters, the accumulated reward distribution being based on at least one previous interaction log determined in a previous iteration, the accumulated reward distribution including an action probability of an action of the previous interaction log being performed according to the current set of parameters, the action probability being approximated using a probability distribution defined by an action selected by the deterministic policy according to the current set of parameters; and
      providing to the other system, via the communication interface, the updated set of parameters of the policy.

2. The system according to claim 1, wherein the policy includes a neural network, the set of parameters including one or more weights of the neural network.

3. The system according to claim 1, wherein the probability distribution for approximating the action probability is centered around the action selected by the deterministic policy according to the current set of parameters.

4. The system according to claim 3, wherein the probability distribution includes a Gaussian distribution, a covariance matrix of the Gaussian distribution being independent from the current set of parameters.

5. The system according to claim 1, wherein the determining of the updated set of parameters includes:
   selecting a subset of the set of interaction logs; and
   optimizing the loss function, the loss function being based on an accumulated reward distribution for the subset of the set of interaction logs.

6. The system according to claim 5, wherein the selecting of the subset of the set of interaction logs includes sampling an interaction log from the set of interaction logs, a probability of an interaction log being sampled increasing with its accumulated reward.

7. The system according to claim 5, wherein the accumulated reward distribution includes a likelihood ratio of a log probability of the previous interaction log occurring according to the current set of parameters versus log probabilities of the previous interaction log occurring according to sets of parameters of interaction logs of the subset of the set of interaction logs, the action probability being included in the likelihood ratio.

8. The system according to claim 1, wherein the optimizing of the loss function includes performing stochastic gradient descent and/or stochastic gradient Hamiltonian Monte Carlo optimization.

9. The system according to claim 1, wherein the optimizing the loss function includes maximizing one or more of:
   an expected accumulated reward;
   a lower bound on an expected accumulated reward;
   a lower confidence bound on an accumulated reward.

10. The system according to claim 1, wherein the loss function includes a penalty decreasing in the effective sample size.

11. A system for interacting with an environment according to a deterministic policy, the policy selecting an action of the system based on a state of the environment, the policy being parametrized by a set of parameters, the system comprising:
   a data interface for accessing the set of parameters of the policy;
   a sensor interface configured to obtain, from a sensor, sensor data indicative of a state of the environment;
   an actuator interface configured to provide, to an actuator, actuator data causing the actuator to effect an action in the environment;
   a processor subsystem configured to control the interaction with the environment by repeatedly:
      via the sensor interface, obtaining sensor data indicative of a current state of the environment;
      determining a current action for the system in the current state according to the policy, wherein the set of parameters of the policy is determined by iteratively optimizing a loss function based on an accumulated reward distribution with respect to the set of parameters, the accumulated reward distribution including an action probability of an action of a previous interaction log being performed according to a current set of parameters, wherein the action probability is approximated using a probability distribution defined by an action selected by the deterministic policy according to the current set of parameters; and
      via the actuator interface providing actuator data to the actuator causing the actuator to effect the current action in the environment.

12. A computer-implemented method of configuring a system which interacts with an environment according to a deterministic policy, the policy selecting an action of the system based on a state of the environment, the policy being parametrized by a set of parameters, the method comprising the following steps:
   communicating with the system;
   accessing a set of interaction logs of the system;
   iteratively optimizing the set of parameters of the policy, by, in an iteration:
      obtaining from the system interaction data indicative of a sequence of states of the environment and of corresponding actions performed by the system;
      storing, as a current interaction log in the set of interaction logs, at least the interaction data and a current set of parameters of the policy according to which the actions were selected by the system;

determining an updated set of parameters of the policy, wherein determining the updated set of parameters includes optimizing a loss function based on an accumulated reward distribution with respect to the set of parameters, the accumulated reward distribution being based on at least one previous interaction log determined in a previous iteration, the accumulated reward distribution including an action probability of an action of the previous interaction log being performed according to the current set of parameters, the action probability being approximated using a probability distribution defined by an action selected by the deterministic policy according to the current set of parameters; and providing to the system the updated set of parameters of the policy.

13. A computer-implemented method of interacting with an environment according to a deterministic policy, the policy selecting an action based on a state of the environment, the policy being parametrized by a set of parameters, the method comprising the following steps:

accessing the set of parameters of the policy;

controlling the interaction with the environment by repeatedly:

obtaining, from a sensor, sensor data indicative of a current state of the environment;

determining a current action in the obtained state according to the policy, wherein the set of parameters of the policy is determined by iteratively optimizing a loss function based on an accumulated reward distribution with respect to the set of parameters, the accumulated reward distribution including an action probability of an action of a previous interaction log being performed according to a current set of parameters, wherein the action probability is approximated using a probability distribution defined by an action selected by the deterministic policy according to the current set of parameters; and providing, to an actuator, actuator data causing the actuator to effect the current action in the environment.

14. A non-transitory computer-readable medium on which is stored data representing instructions for configuring a system which interacts with an environment according to a deterministic policy, the policy selecting an action of the system based on a state of the environment, the policy being parametrized by a set of parameters, the instructions, when executed by a computer, causing the computer to perform the following steps:

communicating with the system;

accessing a set of interaction logs of the system;

iteratively optimizing the set of parameters of the policy, by, in an iteration:

obtaining from the system interaction data indicative of a sequence of states of the environment and of corresponding actions performed by the system;

storing, as a current interaction log in the set of interaction logs, at least the interaction data and a current set of parameters of the policy according to which the actions were selected by the system;

determining an updated set of parameters of the policy, wherein determining the updated set of parameters includes optimizing a loss function based on an accumulated reward distribution with respect to the set of parameters, the accumulated reward distribution being based on at least one previous interaction log determined in a previous iteration, the accumulated reward distribution including an action probability of an action of the previous interaction log being performed according to the current set of parameters, the action probability being approximated using a probability distribution defined by an action selected by the deterministic policy according to the current set of parameters; and providing to the system the updated set of parameters of the policy.

15. A non-transitory computer-readable medium on which is stored data representing instructions for interacting with an environment according to a deterministic policy, the policy selecting an action based on a state of the environment, the policy being parametrized by a set of parameters, the instructions, when executed by a computer, causing the computer to perform the following steps:

accessing the set of parameters of the policy;

controlling the interaction with the environment by repeatedly:

obtaining, from a sensor, sensor data indicative of a current state of the environment;

determining a current action in the obtained state according to the policy, wherein the set of parameters of the policy is determined by iteratively optimizing a loss function based on an accumulated reward distribution with respect to the set of parameters, the accumulated reward distribution including an action probability of an action of a previous interaction log being performed according to a current set of parameters, wherein the action probability is approximated using a probability distribution defined by an action selected by the deterministic policy according to the current set of parameters; and providing, to an actuator, actuator data causing the actuator to effect the current action in the environment.

* * * * *